(12) United States Patent
Taniguchi et al.

(10) Patent No.: US 6,617,734 B2
(45) Date of Patent: Sep. 9, 2003

(54) MAGNETIC BEARING CONTROL DEVICE

(75) Inventors: Manabu Taniguchi, Osaka (JP);
Yasukata Miyagawa, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/891,524

(22) Filed: Jun. 27, 2001

(65) Prior Publication Data

US 2002/0047402 A1 Apr. 25, 2002

(30) Foreign Application Priority Data

Jun. 28, 2000 (JP) .................................. P.2000-194296

(51) Int. Cl.$^7$ ................................................ H02K 7/09
(52) U.S. Cl. ................................. 310/90.5; 310/90.5
(58) Field of Search ........................................ 310/90.5

(56) References Cited

U.S. PATENT DOCUMENTS

| 4,091,687 A | * | 5/1978 | Meinke et al. ............... 188/268 |
| 4,167,296 A | * | 9/1979 | Dendy ........................ 310/90.5 |
| 5,574,345 A | * | 11/1996 | Yoneta et al. ................. 310/74 |
| 5,783,887 A | * | 7/1998 | Ueyama et al. ............. 310/90.5 |
| 6,184,640 B1 | * | 2/2001 | Kawashima ................. 310/42 |

FOREIGN PATENT DOCUMENTS

| JP | 11-22729 | 1/1999 |
| JP | 2000-18245 | 1/2000 |

* cited by examiner

*Primary Examiner*—Dang Dinh Le
(74) *Attorney, Agent, or Firm*—McGinn & Gibb, PLLC

(57) ABSTRACT

The magnetic bearing control device (1) has a motor drive circuit (13) provided with an inverter (13a) for driving the motor (4) capable of generating an electric power, the inverter being controlled by an inverter control circuit (14), and an over-speed detection circuit (17) for detecting the number of revolutions of the rotor (3) that is being rotated by the motor (4), the rotor being supported in non-contact manner by a magnetic bearing (5). When the over-speed detection circuit (17) detects that the rotor (3) is being rotated at a preset number of revolutions or more, the motor drive circuit (13) performs a switching operation of a switch portion 13c provided in the motor drive circuit (13) to separate the inverter (13a) from the motor (4) and connect the motor (4) to a regenerative circuit (13b), whereby the magnetic bearing (5) is driven and controlled, employing a regenerative electric power of the motor (4).

20 Claims, 1 Drawing Sheet

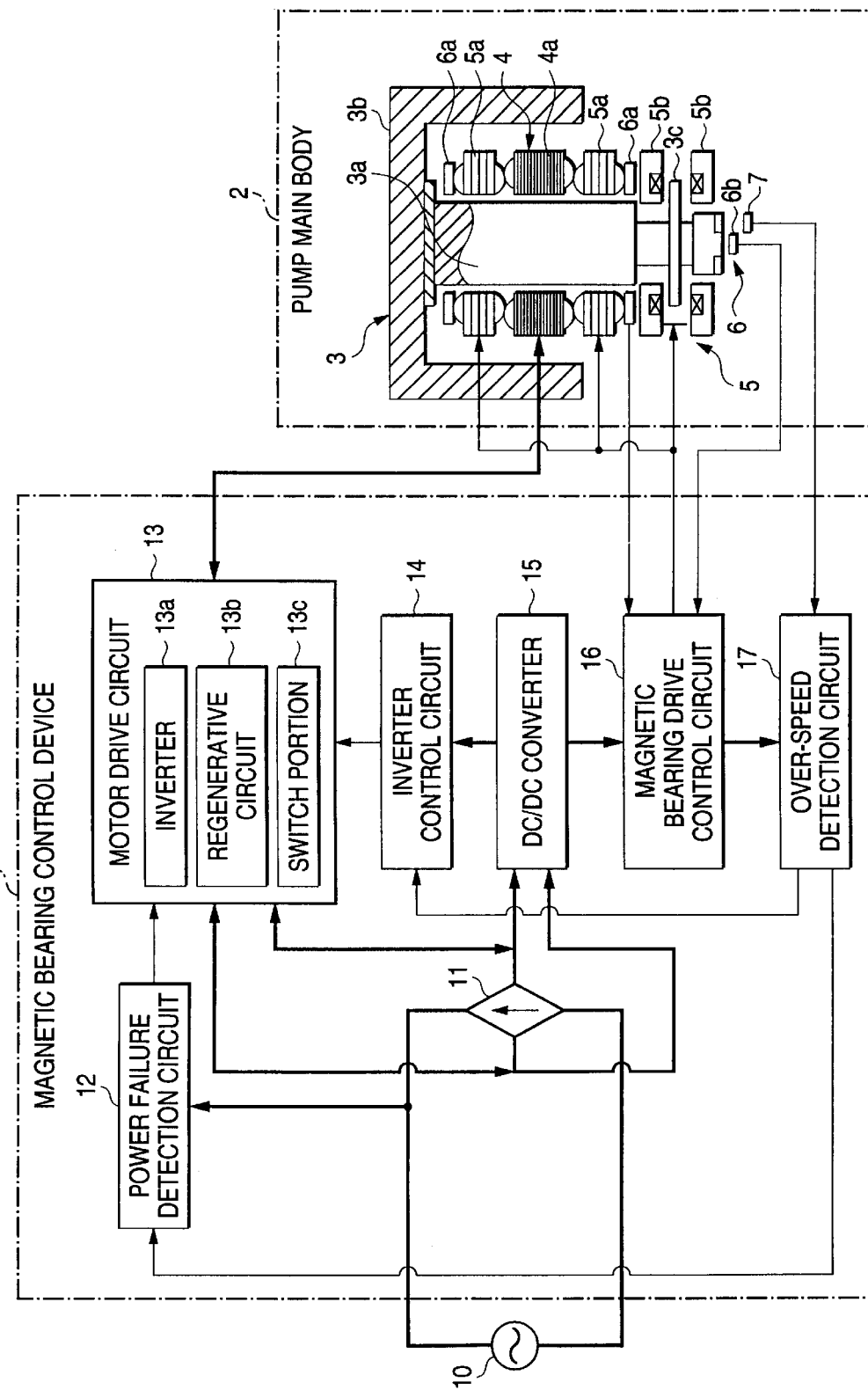

MAGNETIC BEARING CONTROL DEVICE

BACKGROUND OF THE INVENTION

1. Technical Field of the Invention

The present invention relates to a magnetic bearing control device for controlling a magnetic bearing that supports a rotor effecting high speed rotation such as TMP (Turbo Molecular Pump) in non-contact manner in a state of magnetic levitation.

2. Related Art

Generally, a magnetic bearing for supporting a rotor in non-contact manner is known as a bearing for the rotor effecting high speed rotation. A device using such magnetic bearing is a Turbo Molecular Pump (hereinafter referred to as "TMP") used in the semiconductor manufacturing devices, for example. This Turbo Molecular Pump typically has a machine main body (pump main body) for supporting a rotation body (rotor) constituting a pump with a control type magnetic bearing in non-contact manner and rotating it with a motor, and a controller (magnetic bearing control device) for controlling the machine main body.

In the related magnetic bearing control device for TMP, a DSP (Digital Signal Processor) constituting a control unit is usually employed to control the magnetic bearing and an inverter for driving the motor independently of each other (e.g., see JP-A-2000-18245).

Specifically, in the related magnetic bearing control device for TMP, the DSP as a magnetic bearding drive controller outputs an electromagnet control signal for controlling the electromagnets of the magnetic bearing so as to control the magnetic bearing to move the rotor from a touch down bearing up to a predetermined target position in magnetic levitation and support it in non-contact manner. Also, the DSP as an inverter controller outputs a revolution number instruction signal for the motor to the inverter, and the inverter controls the motor to drive and rotate the rotor at a desired number of revolutions based on the revolution number instruction signal. The number of revolutions of the motor is controlled by the inverter so that the rotor maybe rotated at a maximum permissible number of revolutions or less.

However, in the related magnetic bearing control device for TMP as described above, when the number of revolutions cannot be controlled due to a malfunction in the inverter or the DSP caused by the noise, for example, there is the fear that the rotor may be rotated beyond the maximum permissible rotation, causing a centrifugal breakage. Further, there is the fear that an over-current may be supplied to the windings of the motor from the inverter, causing a burning of the windings or a thermal breakage due to rise in temperature of the inverter.

Also, in some of the related magnetic bearing control devices for TMP, a malfunction detection device is provided, as disclosed in JP-A-11-22729, for example. Such related magnetic bearing control devices for TMP controls the inverter or the magnetic bearing in accordance with a malfunction determined by the DSP, when the malfunction is detected by the malfunction detection device. More specifically, when a malfunction such as an abnormal rise in temperature of the inverter or an over-current of the motor is detected, the DSP shut down the supply of electric power from the inverter to the motor for enabling the inverter to effect a so-called free run control for rotating the rotor by inertia, thereby protecting the inverter and the motor. Also, when a malfunction such as an abnormal operation of the magnetic bearing or a power failure is detected, the DSP controls the inverter to brake the motor and stop the rotor promptly.

However, when the inverter itself get out of order and became uncontrollable, or the DSP break down and cannot control the inverter, the related magnetic bearing control device for TMP can not stop the rotational operation of the motor and the rotor, and prevent occurrence of the breakdown of the control object devices such as a centrifugal breakage of the rotor or a burning of the motor windings due to over-current, and the breakdown of the inverter within the control device.

SUMMARY OF THE INVENTION

In the light of the above-mentioned problems associated with the related art, it is an object of the present invention to provide a magnetic bearing control device which is capable of preventing the breakdown of the control object devices such as a rotor and the control device by securely stopping the rotational drive of the rotor by a motor, even when a malfunction occurs in an inverter for driving and controlling the motor.

According to the present invention, there is provided a magnetic bearing control device for controlling a magnetic bearing for supporting a rotor in non-contact manner, and a motor for rotating the rotor and capable of generating an electric power with the rotation of the rotor, comprising:

a magnetic bearing drive controller which drives and controls the magnetic bearing;

a motor drive circuit including an inverter for driving the motor, a regenerative circuit for supplying a regenerative electric power generated by the motor to the magnetic bearing drive controller, and a switch portion for selectively switching the connection of the inverter and the regenerative circuit to the motor;

an inverter controller which controls the inverter; and an over-speed detection circuit for detecting a number of revolutions of the rotor and outputting an over-speed detection signal when the detected number of revolutions is greater than or equal to a preset number of revolutions, wherein the motor drive circuit performs a switching operation of the switch portion to separate the inverter from the motor, and connect the regenerative circuit to the motor, when the over-speed detection signal from the over-speed detection circuit is input.

In the magnetic beating control device as constituted above, when the motor drive circuit performs a switching operation of the switch portion to separate the inverter from the motor, when an over-speed detection signal is input from the over-speed detection circuit. Hence, irrespective of the states of the inverter for driving and controlling the motor and the inverter controller, the motor and the rotor can be securely stopped by shutting off the electric power from the inverter to the motor. Further, since the motor and the regenerative circuit can be connected by the switching operation, the rotor can be stopped promptly by employing a regenerative electric power of the motor that is supplied via the regenerative circuit to the magnetic bearing drive controller, as the magnetic bearing driving power.

Further, according to the invention, there is provided the magnetic bearing control device as described above, further comprising a power failure detection circuit for detecting a power failure, which is connected between the over-speed detection circuit and the motor drive circuit, wherein the power failure detection circuit outputs a switching signal of the switch portion to the motor drive circuit for separating the inverter from the motor, and connect the regenerative circuit to the motor, when the power failure is detected or an over-speed detection signal is input from the over-speed detection circuit.

BRIEF DESCRIPTION OF THE DRAWINGS

FIG. 1 is a block diagram showing a magnetic bearing control device according to one embodiment of the present invention.

DETAILED DESCRIPTION OF PREFERRED EMBODIMENT

The preferred embodiments of a magnetic bearing control device according to the present invention will be described below with reference to the accompanying drawings. In the following, a TMP magnetic bearing control device used in a Turbo Molecular Pump is exemplified.

FIG. 1 is a block diagram showing the magnetic bearing control device according to one embodiment of the invention. In FIG. 1, the Turbo Molecular Pump has the magnetic bearing control device 1 of the invention and a pump main body 2, includes the magnetic bearing control device 1 and the pump main body 2 connected together via the cable or the communication line, for example. In the figure, the bold line indicates the power cable and the other line indicates the communication line for control signal.

The magnetic bearing control device 1 is provided with a rectifier circuit 11 connected to an AC power source 10 (e.g., 200V), a power failure detection circuit 12 for detecting the power failure of the AC power source 10, a motor drive circuit 13 having an inverter 13a, a regenerative circuit 13b and a switch portion 13c and connected to the rectifier circuit 11, and an inverter control circuit 14 as a inverter controller for controlling the inverter 13a. The magnetic bearing control device 1 comprises a DC/DC converter 15 connected to the rectifier circuit 11, a magnetic bearing drive control circuit 16 and an over-speed detection circuit 17 which are connected in series to the DC/DC converter 15. The magnetic bearing control device 1 is provided with an operation switch (not shown) constituted by, for example, an alternate-type push button with a lamp, and a display portion (not shown) for displaying the operation situation of the control device and the pump main body 2, which is composed of a liquid crystal display. It should be note that the display portion may be additionally provided with a function of enabling the user to input the instruction (touch panel function), and employed as an operation panel for the control device and the pump main body 2.

The pump main body 2 is provided with a rotor 3 constituting a pump, a motor 4 for driving and rotating the rotor 3, a magnetic bearing 5 for supporting the rotor 3 in a state of magnetic levitation, a displacement detecting portion 6 for detecting the displacement of the rotor 3, and a revolution number sensor 7 for detecting the number of revolutions of the rotor 3. Also, the pump main body 2 is provided with a touch down bearing (not shown) to regulate the movable range of the rotor 3 in an axial direction and a radial direction, and support the rotor 3 in contact manner, when the pump main body 2 is stopped or the rotor 3 can not be magnetically supported in non-contact manner.

The rotor 3 comprises a spindle portion 3a, and a bucket portion 3b and a disk portion 3c which are respectively connected to and integrally rotatably with one end portion and the other end portion of the spindle portion 3a. The spindle portion 3a constitutes a substantial part of the rotor for the motor 4, a stator 4a of the motor 4 having a coil is wound around its central part. This motor 4 is an induction motor or a brushless DC motor, and can generate the electric power with the rotation of the rotor 3 at the time of power failure, for example.

The magnetic bearing 5 is provided with a radial magnetic bearing 5a and an axial magnetic bearing 5b which support the rotor 3 in non-contact manner in a radial direction and an axial direction, respectively. The radial magnetic bearing 5a and the axial magnetic bearing 5b have a plurality of electromagnets, the electromagnets for the radial magnetic bearing 5a being placed on the top and bottom side of the stator 4a around the spindle portion 3a, and the electromagnets for the axial magnetic bearing 5b being disposed to sandwich the disk portion 3c in its axial direction. Each of the electromagnets develops a magnetic attraction force due to an exciting current from the magnetic bearing drive control circuit 16 to support the rotor 3 in magnetic levitation.

The displacement detecting portion 6 comprises a plurality of radial displacement sensors 6a for detecting the displacement of the rotor 3 in the radial direction, and one axial displacement sensor 6b for detecting the displacement of the rotor 3 in the axial direction. Each of the displacement sensors in the displacement detecting portion 6 outputs an output signal in accordance with a detected displacement to the magnetic bearing drive control circuit 16. The revolution number sensor 7 outputs a pulse signal, for example, in accordance with the number of revolutions detected to the over-speed detecting circuit 17.

In the magnetic bearing control device 1, the motor drive circuit 13 is connected to the motor 4 of the pump main body 2 that is the control object device, the over-speed detection circuit 17 is connected to the revolution number sensor 7 of the pump main body 2, and the magnetic bearing drive control circuit 16 is connected to the magnetic bearing 5 and the displacement detection circuit 6 of the pump main body 2.

The motor drive circuit 13 activates the switch portion 13c in accordance with an instruction signal from the inverter control circuit 14 to switch selectively between the motor 4 or the inverter 13a and the regenerative circuit 13b, thereby effecting the rotational drive or regenerative drive of the motor 4. When either an over-speed detection signal from the over-speed detection circuit 17 or a switch signal from the power failure detection circuit 12 is input, the motor drive circuit 13 activates the switch portion 13c to connect the motor 4 to the regenerative circuit 13b, and separate the inverter 13a from the motor 4. The over-speed detection signal is output from the over-speed detection circuit 17 to the inverter control circuit 14, and the over-speed detection signal is combined into the instruction signal and outputs to the motor drive circuit 13.

The inverter 13a is for driving the motor 4, and comprises a semiconductor integrated circuit, for example. When the inverter 13A is connected via the switch portion 13c to the motor 4, the inverter 13a converts a DC voltage from the rectifier circuit 11 into an AC voltage with variable frequency in accordance with a revolution number instruction signal input from the inverter control circuit 14, and outputs it to enable the motor 4 to perform rotational operation.

The regenerative circuit 13b is for supplying a regenerative power generated by the motor 4 to the magnetic bearing drive control circuit 16, and comprises a semiconductor integrated circuit, for example. The regenerative circuit 13b, when connected via the switch portion 13c to the motor 4, supplies a regenerative power from the motor 4 to the magnetic bearing drive control circuit 16 via the DC/DC converter 15, thereby enabling the magnetic bearing drive control circuit 16 to perform the drive control of the magnetic bearing 5.

The switch portion 13c comprises a semiconductor switch or an electromagnetic coil relay, for example, and can perform operation in accordance with not only an instruction signal input from the inverter control circuit 14 but also a switch signal from the power failure detection circuit 12 and an over-speed detection signal from the over-speed detection circuit 17.

The inverter control circuit 14 comprises a digital processor such as DSP that can execute a control program for controlling the inverter 13a, for example, and operates with a DC voltage from the rectifier circuit 11 that is converted to a predetermined voltage value by the DC/DC converter 15. The inverter control circuit 14 produces a revolution number instruction signal in accordance with the number of revolutions of the rotor 3 input from the over-speed detection circuit 17, and outputs it to the inverter 13a. Thereby, the motor 4 is controlled in respect of the number of revolutions so that the rotor 3 can be rotated at a desired number of revolutions. A DC voltage converted by the DC/DC converter 15 is supplied to the magnetic bearing drive control circuit 16 and the over-speed detection circuit 17, and utilized as the drive voltage for them.

The magnetic bearing drive control circuit 16 constitutes the magnetic bearing drive controller for driving and controlling the magnetic bearing 5, and comprises a digital processor such as DSP that can execute a drive control program for driving and controlling the magnetic bearing 5, for example. The magnetic bearing drive control circuit 16 calculates a control current value for each electromagnet of the magnetic bearing 5 in accordance with a displacement signal from each displacement sensor of the displacement detecting portion 6, and supplies an exciting current to the corresponding electromagnet in accordance with the calculated control current value. Thereby, the rotor 3 is moved in magnetic levitation to a predetermined target position by the magnetic bearing 5, and supported in non-contact manner. The magnetic bearing drive control circuit 16 and the inverter control circuit 14 notify the operation conditions of the magnetic bearing 5 and the motor 4 under control from one to another. Thereby, it is possible to avoid the situations that the rotor 3 is rotated without being moved in magnetic levitation by the magnetic bearing 5, and the rotor 3 under rotation at high speed is not decelerated fully before the magnetic levitation is released, so that the pump main body 2 can be prevented from being damaged due to collision between the rotor 3 and the touch down bearing.

The over-speed detection circuit 17 detects the number of revolutions of the rotor 3 in accordance with a pulse signal from the revolution number sensor 7, and outputs the detected number of revolutions to the inverter control circuit 14. The over-speed detection circuit 17 performs a comparison between the detected number of revolutions for the rotor 3 and a preset number of revolutions. Upon detecting that the rotor 3 is rotating at the preset number of revolutions or higher, an over-speed detection signal is output to the power failure detection circuit 12 and the inverter control circuit 14.

The power failure detection circuit 12 monitors the voltage of the AC power source 10, and upon detecting that the AC voltage falls below a predetermined value, outputs a switch signal of the switch portion 13c to the motor drive circuit 13 for separating the inverter 13a from the motor 4, and connecting the regenerative circuit 13 to the motor 4. Further, when an over-speed detection signal from the over-speed detection circuit 17 is input, the power failure detection circuit 12 outputs a switch signal of the switch portion 13c for separating the inverter 13a from the motor 4 and connecting the regenerative circuit 13b to the motor 4 in the same manner as when a power failure of the AC power source 10 is detected.

In the magnetic bearing control device 1 as constituted in the above manner, the over-speed detection circuit 17 detects the number of revolutions of the rotor 3 included in the control object devices, and when the number of revolutions is more than or equal to the preset number of revolutions, outputs an over-speed detection signal via the inverter control circuit 14 to the motor drive circuit 13. The motor drive circuit 13 performs the switching operation of the switch portion 13c, upon accepting the over-speed detection signal, thereby separating the inverter 13a from the motor 4 and connecting the regenerative circuit 13b to the motor 4. Thereby, the magnetic bearing control device 1 can shut down the supply of electric power from the inverter 13a to the motor 4 to stop the rotational drive of the motor 4 and the rotor 3, and stop urgently the rotor 3 by employing a regenerative power of the motor 4 to drive and control the magnetic bearing 5, when the inverter 13a can not effect the control for the number of revolutions of the motor 4 such as when a malfunction occurs in the inverter 13a, or the inverter 13a itself fails and is uncontrollable by the inverter control circuit 14. As a result, the magnetic bearing control device 1, unlike the related example, can prevent the rotor 3 from being rotated at the maximum permissible rotation or more, and from causing a centrifugal breakage. Further, the inverter 13a having caused a malfunction or failure is prevented from passing an over-current to the motor 4, and burning of the winding of the motor 4 or thermal breakage of the inverter 13a due to rise in temperature can be avoided.

Also, in the magnetic bearing control device 1, when the power failure detection circuit 12 detects a power failure of the AC power source 10, the power failure detection circuit 12 outputs a switch signal to the motor drive circuit 13 to effect the switching operation of the switch portion 13c as described above. Therefore, the magnetic bearing drive control circuit 16 drives and controls the magnetic bearing 5, employing a regenerative power of the motor 4 from the regenerative circuit 13b, so that the rotor 3 can be landed on the touch down bearing without damaging the rotor 3 in magnetic levitation even during the power failure.

Further, in the magnetic bearing control device 1, when the power failure detection 12 receives an over-speed detection signal from the over-speed detection circuit 17, the switch signal is output to the motor drive circuit 13. Therefore, when a malfunction or failure occurs not only in the inverter 13a, but also in the inverter control circuit 14 for directly controlling the inverter 13a, the rotational operation of the motor 4 and the rotor 3 can be securely stopped, whereby it is possible to protect the rotor 3 from centrifugal breakage or the control object devices from burning of the winding of the motor 4 caused by an over-current, or the inverter 13a within the control device from breakage.

In the above explanation, the magnetic bearing control device 1 is employed for the Turbo Molecular Pump, but the invention is not limited thereto. The invention is also applicable, so far as the control device controls the magnetic bearing for supporting the rotor in non-contact manner, and the motor for rotating the rotor and capable of generating electric power with the rotation of the rotor. Specifically, the magnetic bearing control device 1 of the invention is suitably applicable to a lathe with a spindle using the magnetic bearing, a machining sensor, a tool machine such as a grinder, a compressor using a magnetic bearing, a fluid machine such as a blower, and a magnetic bearing used for a fly-wheel.

In the above explanation, the over-speed detection circuit 17 detects the number of revolutions of the rotor 3 in accordance with a pulse signal from the revolution number sensor 7, and outputs the detected number of revolutions to the inverter control circuit 14. However, the inverter control circuit 14 may detect the number of revolutions of the rotor 3 by directly outputting the pulse signal from the revolution number sensor 7 to the inverter control circuit 14.

Also, in the above explanation, the power failure detection circuit 12 is provided, but the invention is not limited thereto. When the control device is connected to an uninterruptive power source system, for example, the power failure detection circuit 12 can be omitted. When the power failure detection circuit 12 is omitted, the over-speed detection circuit 17 and the motor drive circuit 13 are connected to output directly the over-speed detection signal to the motor drive circuit 13, in order to cope with a situation where the motor 4 is uncontrollable in the number of revolutions due to a malfunction or failure of the inverter control circuit 14.

The present invention has the following effects.

With a magnetic bearing control device according to the invention, the motor drive circuit performs a switching operation of the switch portion to separate the inverter from the motor, when an over-speed detection signal is input from the over-speed detection circuit. Hence, irrespective of the states of the inverter for driving and controlling the motor and the inverter controller for controlling the inverter to drive and control the motor, the motor and the rotor can be securely stopped by shutting off the electric power from the inverter to the motor. Further, since the motor and the regenerative circuit can be connected by the switching operation, the rotor can be stopped promptly by employing a regenerative electric power of the motor that is supplied via the regenerative circuit to the magnetic bearing drive controller, as the magnetic bearing driving power. Accordingly, with this magnetic bearing control device, even when the inverter for driving and controlling the motor fails, the rotor can be securely stopped, while the motor is driving the rotation. Therefore, the control object devices such as rotor and the control device can be prevented from breaking down.

Further with the magnetic bearing control device according to the invention, the power failure detection circuit outputs a switching signal of the switch portion to the motor drive circuit to separate the inverter from the motor, and connect the regenerative circuit to the motor, when a power failure is detected or an over-speed detection signal is input from the over-speed detection circuit. Therefore, the motor and the rotor can be securely stopped, and employing the regenerative electric power, the magnetic bearing drive controller can control the magnetic bearing during power failure to land the rotor in magnetic levitation without damage.

What is claimed is:

1. A magnetic bearing control device for controlling a magnetic bearing for supporting a rotor in non-contact manner, and a motor for rotating said rotor and capable of generating an electric power with the rotation of said rotor, comprising:

a magnetic tearing drive controller which drives and controls said magnetic bearing;

a motor drive circuit including an inverter for driving said motor, a regenerative circuit for supplying a regenerative electric power generated by said motor to said magnetic bearing drive controller, and switch portion for selectively switching the connection of said inverter and said regenerative circuit to said motor;

an inverter controller which controls said inverter; and an over-speed detection circuit for detecting a number of revolutions of said rotor and outputting an over-speed detection signal when the detected number of revolutions is greater than or equal to a preset number of revolutions;

wherein said motor drive circuit performs a switching operation of the switch portion to separate the inverter from said motor, and connect the regenerative circuit to said motor, when the over-speed detection signal from said over-speed detection circuit is input.

2. The magnetic bearing control device according to claim 1, further comprising a power failure detection circuit for detecting a power failure, which is connected between said over-speed detection circuit and said motor drive circuit, wherein said power failure detection circuit outputs a switching signal of said switch portion to said motor drive circuit for separating said inverter from said motor, and connect said regenerative circuit to said motor, when the power failure is detected or an over-speed detection signal is input from said over-speed detection circuit.

3. The device of claim 2, wherein said power failure detection circuit, forwards said over-speed detection signal from said over-speed detection circuit to said motor drive circuit.

4. The device of claim 1, further comprising a DC/DC converter in communication with said magnetic bearing drive controller and said inverter controller.

5. The device of claim 4, wherein said DC/DC converter is in communication with said motor drive circuit.

6. The device of claim 5, wherein said DC/DC converter is in communication with said regenerative circuit.

7. The device of claim 4, further comprising a rectifier in communication with an AC power supply and said DC/DC converter.

8. The device of claim 7, wherein said over-speed detection circuit provides said over-speed signal to said inverter which provides an instruction signal to said motor drive circuit to operate said switch portion.

9. A power supply for a magnetic bearing controller, comprising:

a regenerative circuit for providing power from a motor to said magnetic bearing controller;

an over-speed detector that generates an over-speed signal when the speed of said motor is greater than or equal to a predetermined speed; and a switch that switches said motor from an inverter in a motor controller to said regenerative circuit in response to said over-speed signal.

10. The power supply of claim 9, further comprising a power failure detector that detects a power failure and outputs a power failure signal, wherein said switch further switches said motor from said inverter in said motor controller to said regenerative circuit in response to said power failure signal.

11. The power supply of claim 10, wherein said power failure detector is connected between said over-speed detector and said motor controller.

12. A magnetic bearing controller comprising:
a magnetic bearing drive controller which drives a magnetic bearing in a motor;
a motor drive circuit including:
   an inverter that drives said motor;
   a regenerative circuit that provides regenerative power from said motor to said magnetic bearing drive controller; and
   a switch that switches said motor between said inverter and said regenerative circuit; and
an over-speed detector that generates a switch signal if the speed of said motor is greater than or equal to a predetermined speed,
wherein said switch switches said motor from said inverter to said regenerative circuit in response to said switch signal.

13. The controller of claim 12, further comprising a power failure detector that generates a second switch signal, wherein said switch switches said motor from said inverter to said regenerative circuit in response to said second switch signal.

14. The controller of claim 13, wherein said power failure detector is connected between said over-speed detector and said motor drive circuit.

15. The controller of claim 14, wherein said power failure detector forwards said first switch signal from said over-speed detector to said motor drive circuit.

16. The controller of claim 14, wherein said power failure detector forwards said second switch signal from said over-speed detector to said motor drive circuit.

17. The controller of claim 12, further comprising:
   an inverter controller di controls said inverter; and
   a DC/DC converter in communication with said magnetic bearing drive controller and said inverter controller.

18. The controller of claim 17, wherein said DC/DC converter is in communication with said motor drive circuit.

19. The controller of claim 18, wherein said DC/DC converter is in communication with said regenerative circuit.

20. The controller of claim 17, further comprising a rectifier in communication with an AC power supply and said DC/DC converter.

* * * * *